May 19, 1931.  H. W. HOLMES  1,806,461
EQUIPMENT FOR ELECTRIC VACUUM CLEANERS AND THE LIKE
Filed June 16, 1928

Inventor
Harry W. Holmes,
By Conway Cox
Attorney

Patented May 19, 1931

1,806,461

UNITED STATES PATENT OFFICE

HARRY W. HOLMES, OF RAHWAY, NEW JERSEY, ASSIGNOR TO THE REGINA CORPORATION, OF RAHWAY, NEW JERSEY, A CORPORATION OF NEW JERSEY

EQUIPMENT FOR ELECTRIC VACUUM CLEANERS AND THE LIKE

Application filed June 16, 1928. Serial No. 286,043.

This invention relates to equipment for electrically driven apparatus such as vacuum cleaners, floor waxers, and the like, and more particularly to devices of these types which are portable and provided with handles for moving them over the surfaces to be treated.

The objects of my invention are to provide a hollow detachable handle which can be quickly and conveniently secured to the power driven apparatus in a permanent manner and likewise detached therefrom; and while utilizing the hollow handle as a conduit for the wires which conduct electricity from a source of current at one end of the handle to the motor at the other end, to provide a concealed plug within the handle for making or breaking the circuit through the concealed wires, which plug may be readily withdrawn from the hollow handle.

It has hitherto been the custom to provide a long lead from the room outlet or socket to a switch at the upper end of the handle in order to permit the apparatus to be moved to points at a distance from the outlet, and to further equip the apparatus with a lead from the handle switch to the motor by extending insulated wires along the outside or inside of the handle. Sometimes this lead has been opened between the motor and the lower end of the handle and a connecting plug inserted. Such construction is objectionable in that the cord is liable to much wear and tear and the loose plug on the outside is a constant source of danger due to the possibility of its accidental disconnection. The present invention obviates these difficulties by placing the cord within the handle out of the way and thereafter concealing the connecting plug within the handle. The decreased length of cordage made possible by the concealment of the plug presents a loop of loose cable just long enough to reach from the motor casing to its point of entry within the handle, eliminating the danger of its being caught on the corners and protruding edges of pieces of furniture and other obstructions when the apparatus is being used.

Other objects will become apparent from a study of the following description when taken in connection with the accompanying drawings, in which Figure 1 is an end elevation of the assembled device, the upper end of the handle and the motor casing having been removed.

Figure 1:
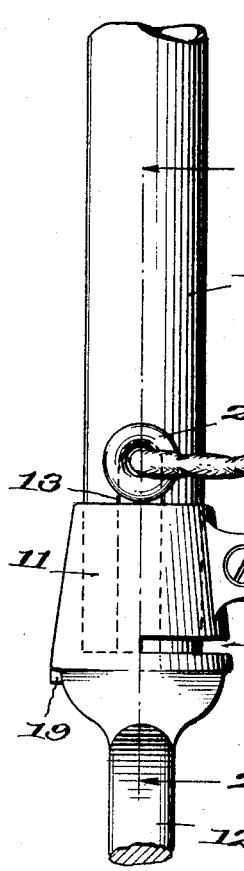
Figure 2:
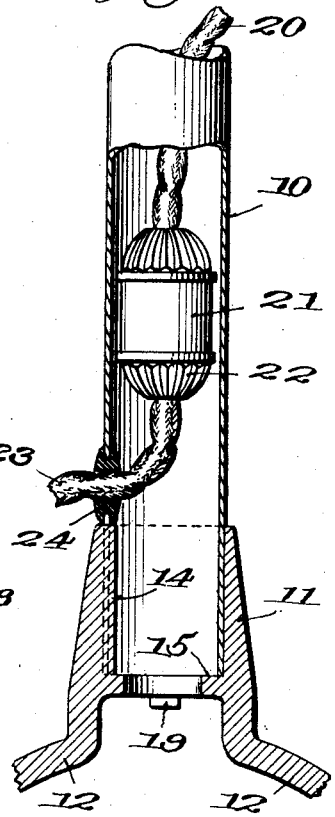
Figure 2 is a section taken on the line 2—2 of Figure 1, as seen when looking in the direction of the arrows.

Referring to the drawings, a handle 10 is mounted in a socket 11 which is formed integrally with a fork 12. The upper end of the handle may be of any conventional design and the fork straddles and is connected to a motor casing or the like (not shown). The handle is provided with a slot 13 for receiving a key 14 when the handle is inserted in the socket 11. The key prevents rotation of the handle and an internal annular shoulder or abutment 15 limits the downward movement thereof.

The socket 11 is slotted at 16 and provided with a pair of outwardly projecting opposing ears or lugs 17 which may be drawn together by a screw 18 to cause the socket to grip the handle. 19 is a tilting device stop; nothing further need be said of it because it forms no part of the present invention.

A cable 20 is disposed within the hollow handle and connected in a conventional manner at its upper end with a controlling switch (not shown). At its lower end a receptacle 21 dangles for receiving the plug 22 which is provided at one end of the motor cable proper, 23. The other end of the cable 23 is connected to the motor (not shown) in any conventional manner. A bushing 24, preferably formed of hard rubber or any other suitable insulating composition and having a smooth inner bore, encircles the motor cable and is accurately positioned and fixed within the slot by cooperation of the edges of the latter with a peripheral groove 25 on the bushing. The bottom portion of the bushing 24 may be so shaped as to be squared, when seen in elevation as in Figure 1, in order for it to completely close the slot 13 just above the socket.

Figure 3:
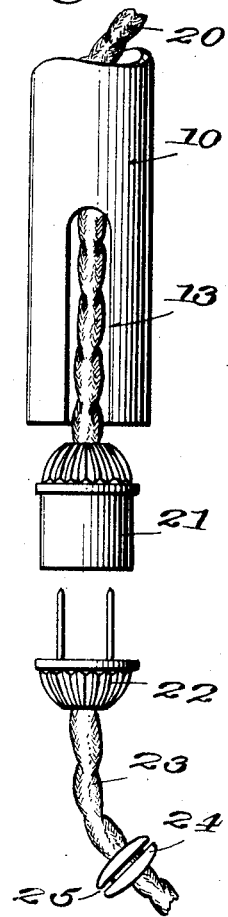
Figure 3 shows the lower end of the handle and its associated connecting plug and cables in disassembled position.
Figure 4:
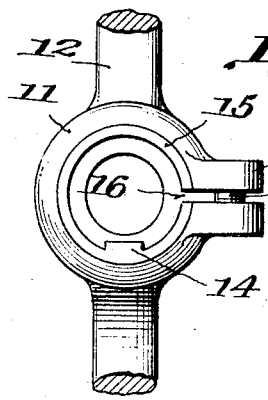
Figure 4 is a plan view of the handle fork or, more appropriately expressed, the handle receiving socket.

Figure 3 shows the parts of the device in disassembled relationship. To assemble, the plug 22 is pushed into receptacle 21 and both units then drawn up into the hollow handle. During this latter movement the bushing 24 is slipped upwardly into the bottom of the slot 13 with its groove 25 in sliding engagement with the edges of said slot. The handle is then inserted in the socket with its slot in alignment with key 14 and the screw 18 is tightened to complete the assembly. The key 14, in addition to preventing rotation of the handle, positively prevents collapse or distortion of the lower end of the latter when the screw 18 is tightened.

Having dscribed my invention with particularity, I wish it to be understood that the drawings are only illustrative of one manner of carrying it into practice, and that various changes in the details and combination and arrangement of parts may be made, such changes to be limited only by the scope of the appended claims.

What I claim is:

1. An attachment for electrical apparatus, comprising a hollow operating handle, a receiving socket therefor, a key secured within the socket, a slot in the handle for cooperation with said key, and a cable concealed within the hollow handle and extending outwardly through said slot above the socket and key.

2. An attachment for electrical apparatus, comprising a hollow operating handle, a receiving socket therefor, a key secured within the socket, a slot in one end of the handle for engaging the key, a bushing, said slot being of greater length than the key in order to receive said bushing and key, a main cable and a connecting cable, and a plug connecting the two cables, said main cable and plug being disposed within the hollow handle and said connecting cable passing out of the handle through said bushing.

3. An attachment for electrical apparatus comprising a hollow operating handle, a receiving socket therefor, means for detachably securing an end of said handle in the socket, the end of the handle secured in the socket being provided with a slot extending from its extremity to a point above the top of the adjacent edge of the receiving socket when the handle is secured in the socket, a main cable, a connecting cable, and a plug connecting the two cables, said main cable and plug being disposed within the hollow handle, and said connecting cable passing out of the handle through the slot.

In testimony whereof, I have hereunto set my signature.

HARRY W. HOLMES.